United States Patent [19]

Isanhart

[11] Patent Number: 5,487,457
[45] Date of Patent: Jan. 30, 1996

[54] PRESSURE ACTIVATED ROTARY CLUTCH

[75] Inventor: Bowdie J. Isanhart, Fort Smith, Ark.

[73] Assignee: Entrepreneurial Technologies, Inc., Little Rock, Ark.

[21] Appl. No.: 264,158

[22] Filed: Jun. 22, 1994

[51] Int. Cl.⁶ .................................. F16D 31/00
[52] U.S. Cl. ........................ 192/58.2; 192/82 T
[58] Field of Search ................ 192/58 R, 58 A, 192/60, 82 T

[56] References Cited

U.S. PATENT DOCUMENTS 1,645,565  10/1927  Wingquist ........................ 192/58 R
5,199,539   4/1993  Kikuch ............................. 192/60

FOREIGN PATENT DOCUMENTS 2211918   7/1989  United Kingdom ................ 192/58 R Primary Examiner—Richard M. Lorence
Attorney, Agent, or Firm—C. J. Fildes & Co.

[57] ABSTRACT

A pressure activated rotary clutch includes a sealed unit including a casing and a cover mounted to and rotatable about a rotating shaft. The unit includes a circumferentially extending outer wall and a circumferentially extending inner wall having an outwardly extending lobe having major and minor dimensions from said shaft and also a fluid passageway having an inlet on one side of said minor dimension and an outlet on the other side of said minor dimension. A flow control valve is disposed in the fluid passageway for controlling fluid flow through the passageway. A flow control valve actuator in communication with the flow control valve operates the flow control valve. A rotor fixed to the rotating shaft includes at least one vane for moving or pumping fluid through the fluid passageway when it is open and the shaft is rotated. The unit rotates independently of the shaft and rotor when the passageway is unrestricted. The unit rotates with the shaft and rotor when the valve is operated to restrict fluid flow through the fluid passageway, thereby engaging the clutch.

15 Claims, 2 Drawing Sheets

PRESSURE ACTIVATED ROTARY CLUTCH

FIELD OF THE INVENTION

This invention relates to a pressure activated rotary clutch having a rotating driving member that circulates an incompressible fluid between chambers in a driven member while disengaged and wherein the driving member rotates the driven member when fluid circulation between the chambers is restricted.

BACKGROUND OF THE INVENTION

It is known in the art of engine cooling to use a fan connected to an engine powered driving member such as the engine water pump via a shaft or belt to increase the airflow over an associated engine heat exchange device. The discovery some thirty years ago that an engine only needs to be cooled about ten percent of its operating time led to the design and production of a fan clutch utilizing fluid shear to couple the fan to the driving member. This fan clutch operates by passing a viscous silicone fluid between several sets of grooves and lands. The grooves and lands are separated several thousandths of an inch in which the silicone fluid is allowed to flow. The specific spacing is determined by the viscosity of the fluid and the power to be transmitted. This fluid serves as a medium for transmitting torque between the driving member and the fan.

Conventionally, there are two basic types of fluid shear fan clutches. One type operates in either an on or off mode. The other operates in a modulating mode between totally on or totally off. The on/off fan clutch performs well but because of its mode of operation it does not provide optimum cooling. For this reason it is used less often than the modulating fan clutch. The on/off fan type clutch has further limitations that are also found in the modulating type clutch. Neither unit when fully engaged is able to transmit better than eighty five percent of the input R.P.M. into fan rotation. The ability to transmit close to one hundred percent of the input R.P.M. would allow for more efficient cooling.

Both types of fan clutches have common areas where improvements can be made, outside of the range of R.P.M. that can be reached. The first is in lowering the fan clutch operating temperature. Current fan clutches operate by shearing viscous silicone fluid. This shearing process generates very high temperatures, as high as 780 degrees F. in some extreme cases and 480 to 500 degrees F. on a regular basis. Operation under these high temperatures causes less efficient clutch operation. Due to these high temperatures, aluminum and steel are the only cost effective materials which can be used internally. The grooves and lands which are required to shear the silicone fluid must have very close tolerances and thus require precise manufacturing. Therefore, the grooves and lands are machined out of a diecast aluminum blank. This machining is very time consuming and expensive. Since the internal temperatures of the clutches are so high, a less expensive manufacturing method, such as injection molding of a thermoplastic is not possible.

The modulating fan clutch is designed to increase the ratio of input R.P.M. to output R.P.M. as the temperature in the engine compartment rises. The outer limits of modulating operation resemble the on/off fan clutch, but between these limits the modulating fan clutch does not always operate as designed. This operational limitation is due to the reservoir and valve which control the fluid in the fan clutch. The valve must let fluid out of the reservoir at a precise flow rate in order to place the correct amount of fluid between the grooves and lands and thus obtain the desired R.P.M. ratio.

A problem that both types of fan clutches have is when the engine is not running. When the engine is not running the valve on the reservoir leaks fluid into the grooves. Upon engine ignition the fan clutch is thus engaged even though the engine is considered cold. This is not desirable because automobile owners hear the fully engaged fan clutch over the idling engine and think that there is a problem.

Furthermore, because of fan engagement at start up and the resulting increase in engine warm up time, the higher level of vehicle emissions occurring at start up are maintained for a longer period of time.

SUMMARY OF THE INVENTION

The present invention provides a clutch that utilizes fluid pressure to effect the coupling thereby eliminating the inefficiency of couplings utilizing fluid shear as the drive medium, and the high temperature operation associated therewith.

Accordingly, it is an object of the invention to provide a clutch that exhibits little heat build up and can be constructed of plastic material.

Another object of the invention is to provide an engine cooling fan clutch having virtually no engagement at engine start-up and is unaffected by ambient conditions of summer or winter.

A further object of the invention is to provide a clutch that can be controlled by remote sensing.

Yet another object of the invention is to provide a clutch that can be made torque limiting.

A more specific object of the invention is to provide a pressure activated rotary clutch comprising a sealed unit, including a casing and a cover. The unit is mounted to and rotatable about a rotating shaft. The shaft defines an axial direction and has a leading end disposed in the unit. The unit includes a circumferentially extending outer wall to which a driven element such as a fan can be attached or integrally formed. The unit also includes a circumferentially extending inner wall, that includes an outwardly extending lobe having a major dimension and a minor dimension from the shaft. The circumferentially extending inner wall also includes a fluid passageway therein having an inlet in the inner wall on one side of the minor dimension and an outlet in the inner wall on the other side of the minor dimension for conducting a hydraulic fluid therethrough.

A flow control valve is disposed in the fluid passageway and controls fluid flow through the passageway. A flow control valve actuator is in communication with the flow control valve and operates the flow control valve. A rotor fixed to the leading end of the rotating shaft is rotatable with the rotating shaft. A vane on the rotor moves or pumps hydraulic fluid around the inside of the unit and through the fluid passageway (when open) by a pumping action when the shaft is rotated. The rotor is in proximity with the minor dimension of the inner wall at all times and forces the fluid being circulated to pass through the flow control valve. The unit and driven element (fan) rotate independently of the shaft and rotor when the fluid passageway is unrestricted. The unit and fan rotate with the shaft and rotor when the flow control valve is operated to restrict fluid flow through the fluid passageway.

Accordingly, the circumferentially extending inner wall can be formed of a multi-lobed profile having a plurality of lobes with fluid passageways therebetween and valves therein. Likewise the rotor can include a plurality of vanes corresponding to the plurality of lobes. Together with the profile of the inner wall and rotor, chambers are formed between adjacent vanes.

The flow control valve actuator may be a pressure or temperature sensitive actuator or an adjustably controllable actuator that can be controlled by a controller that senses and responds to engine or engine compartment parameters. Such a controller can be a part of the unit or can be located at a location removed from the unit and in communication with the unit.

An advantage of driving the clutch by stopping fluid flow is that the clutch will run cooler allowing it to be made of plastic material thereby significantly reducing clutch cost.

These objects and other features and advantages of the invention will be more fully understood from the following Detailed Description of the Invention taken together with the accompanying drawings.

DETAILED DESCRIPTION OF THE INVENTION

Figure 1:
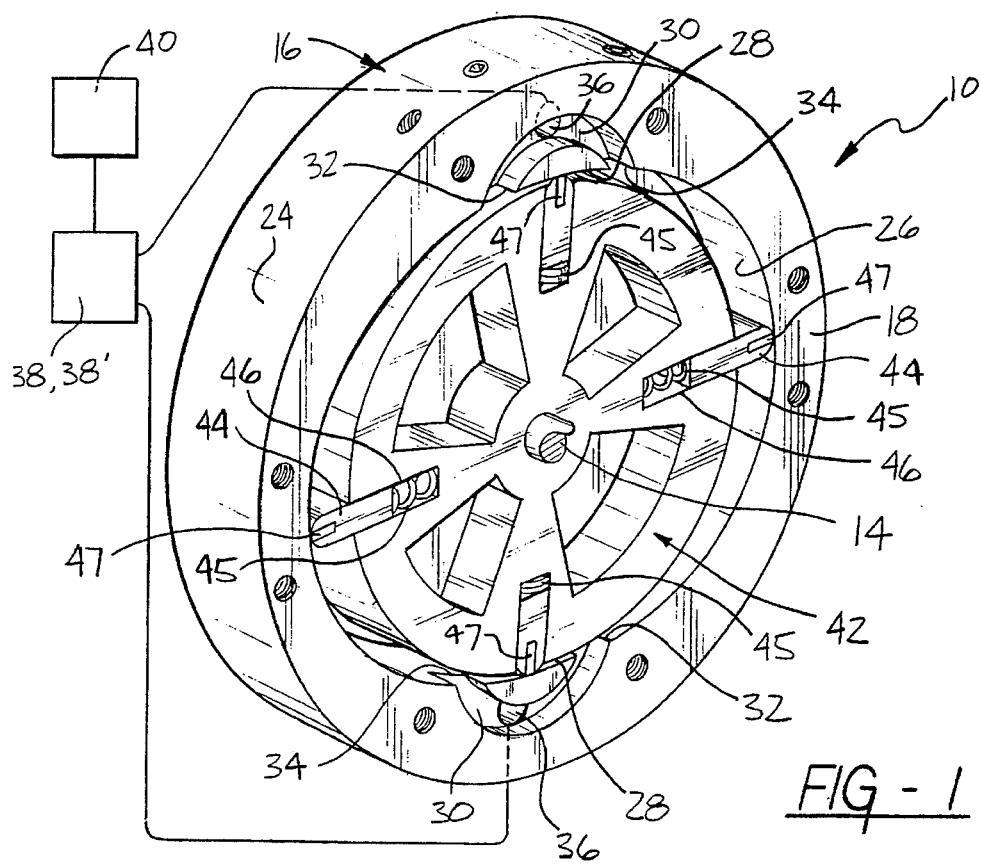
FIG. 1 is a perspective view of a pressure activated rotary clutch (with cover removed) constructed in accordance with the present invention.

Referring now to the drawings in detail, numeral 10 generally indicates a pressure activated rotary clutch for coupling a driven element, shown as an engine cooling fan 12, with a rotating shaft 14 driven by a driving means such as an engine. Clutch 10 utilizes a controlled lock up of a hydraulic (incompressible) fluid being trapped within the clutch to create a coupling as more fully hereinafter described. Although clutch 10 is described with reference to clutching an engine cooling fan 12 seen in FIG. 3, it will be understood from the following description that the clutch 10 has many applications such as in connection with an air conditioning compressor, riding lawnmower, etc. or other power transmission or power take off application.

Figure 2:
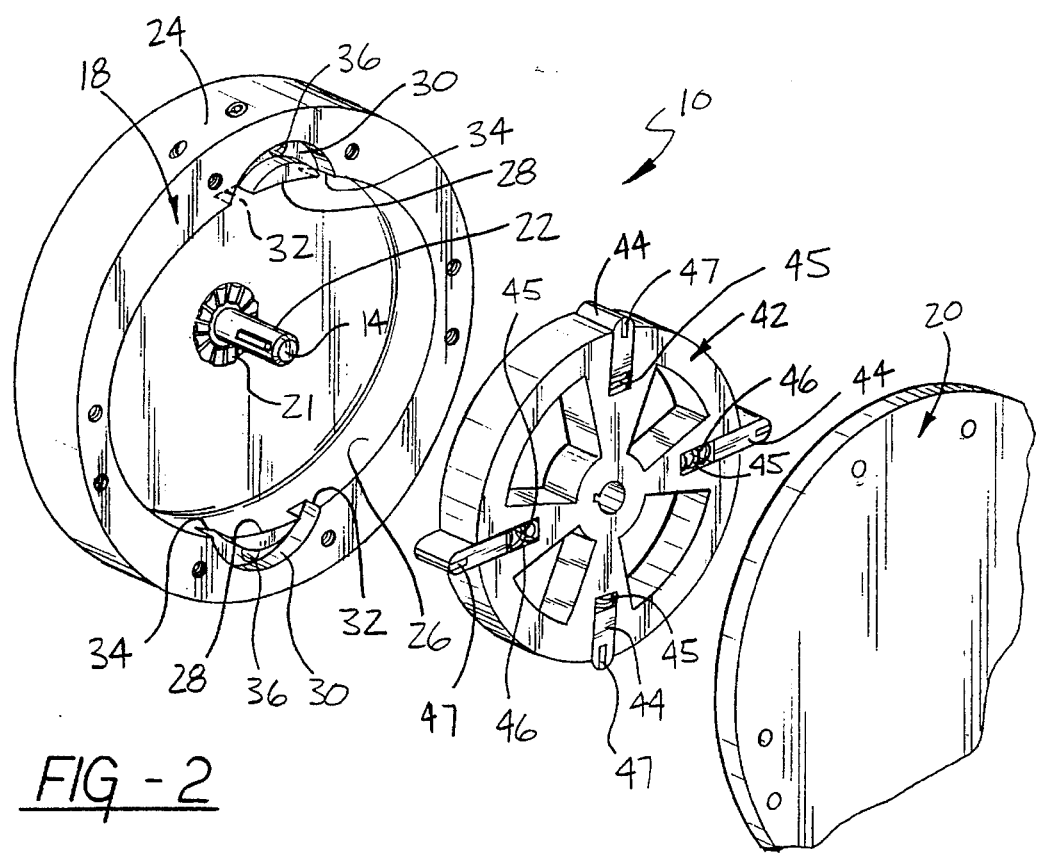
FIG. 2 is an exploded perspective view of the clutch of FIG. 1 illustrating a casing, rotor and cover.

As illustrated in FIGS. 1 and 2, the clutch 10 includes a sealed unit 16 including a casing 18 and a cover 20. The unit 16 is mounted to and rotatable about rotatable shaft 14 by a connection including a bearing 21. Rotating shaft 14 can be a stub shaft mounted in the sealed unit 16 or a shaft extending from a water pump (not shown) or other engine driven shaft. Rotating shaft 14 defines an axial direction and has a leading end 22 disposed in the unit 16. The unit 16 includes a circumferentially extending outer wall 24 to which the fan 12 is connected. Sealed unit 16 also includes a circumferentially extending inner wall 26 illustrated in FIG. 2.

The circumferentially extending inner wall 26 is of a multi-lobed profile, herein illustrated as an ellipse. The inner wall 26 includes two diametrically opposed lobes extending outward from opposed minor radii or dimensions at 28 to intermediate opposed major radii or dimensions as measured from the axis of shaft 14. The inner wall 26 also includes a fluid passageway 30 defined by a semicircular valve groove in the area of each minor radius 28. Each passageway 30 has an inlet 32 in the inner wall on one side of a minor radius 28 and an outlet 34 in the inner wall on the other side of the minor radius. A flow control valve 36 is disposed in each fluid passageway 30 for regulating fluid flow through the passageway 30.

A flow control valve actuator 38 is in communication or integral with the flow control valve 36 and operates the flow control valve. Actuator 38 can be a pressure sensitive or temperature sensitive actuator including a bimetal coil or biphase material plunger of conventional design. Such devices are available from Omnimet Corporation of Troy, Mich. and Caltherm Corporation of Bloomfield Hills, Mich. Alternatively, actuator 38 can be an adjustably controllable actuator 38' for modulating operation of the flow control valve 36 and controlling torque transmission through the clutch. In this case, a controller 40 in communication with actuator 38' is responsive to engine or engine compartment operating parameters, including coolant temperature. Controller 40 controls the operation of valve 36 and can be integrated within the unit 16 or placed at a location removed from the unit. Alternatively, actuator 38' can be controlled by the engine control module, not shown.

With continued reference to FIGS. 1 and 2, a rotor 42 is fixed for rotation to the leading end 22 of the rotating shaft 14. Rotor 42 is mounted in a close tolerance fit along the axial direction between the casing 18 and cover 20. Four vanes 44 are mounted in radially extending slots 46 formed in the rotor 42. Vanes 44 move or pump incompressible hydraulic fluid around inside the casing 18 along the inner wall 26 and through the fluid passageways 30 when shaft 14 is rotated and the valve 36 is open. The outer peripheral surface of the rotor 42 is in close proximity with the minor radius 28 of inner wall 26 such that the fluid volumes between the inlet and outlet of passageway 30 are seperated.

The independently radially moveable relationship of the vanes 44 relative to the rotor 42 illustrated, allows the vanes to follow the contour of the inner wall 26 and maintain contact with the circumferentially extending inner wall. This contact is accomplished through centrifugal force acting on the vanes 44 as the rotor 42 is rotated and/or the inclusion of springs 45, of a conventional configuration, radially biasing the vanes outwardly. To enhance sealing and reduce the inherent wear between the vanes 44 and inner wall 26, seals 47 are provided the distal end of each vane. APEX type seals have been effectively used as the seals 47.

When passageways 30 are unrestricted, unit 16 and fan 12 rotate virtually independently of the shaft 14 and rotor 42, as fluid is conducted around the inside of the unit 16 by the pumping action of the rotating vanes 44 forcing fluid through the passageways. When flow control valve 36 is operated to restrict fluid flow through the passageways 30, the unit 16 and driven element or fan 12 rotate with the shaft 14 and rotor 42. Rotation occurs at shaft speed or a portion thereof, as the fluid cannot be conducted or pumped around the inside of the unit 16 at the rate of the pumping action of the rotating vanes 44. If valves 36 are operated to completely interrupt the flow of fluid being conducted through passageways 30, there is a fluid lock up and the rotor 42 and unit 16 rotate at essentially the same rotational speed, reduced by any system losses.

Operating under conditions of fluid lock up rather than fluid shear allows the clutch 10 to operate at much lower temperatures than conventional fan clutches thereby lending itself to plastic construction.

Figure 3:
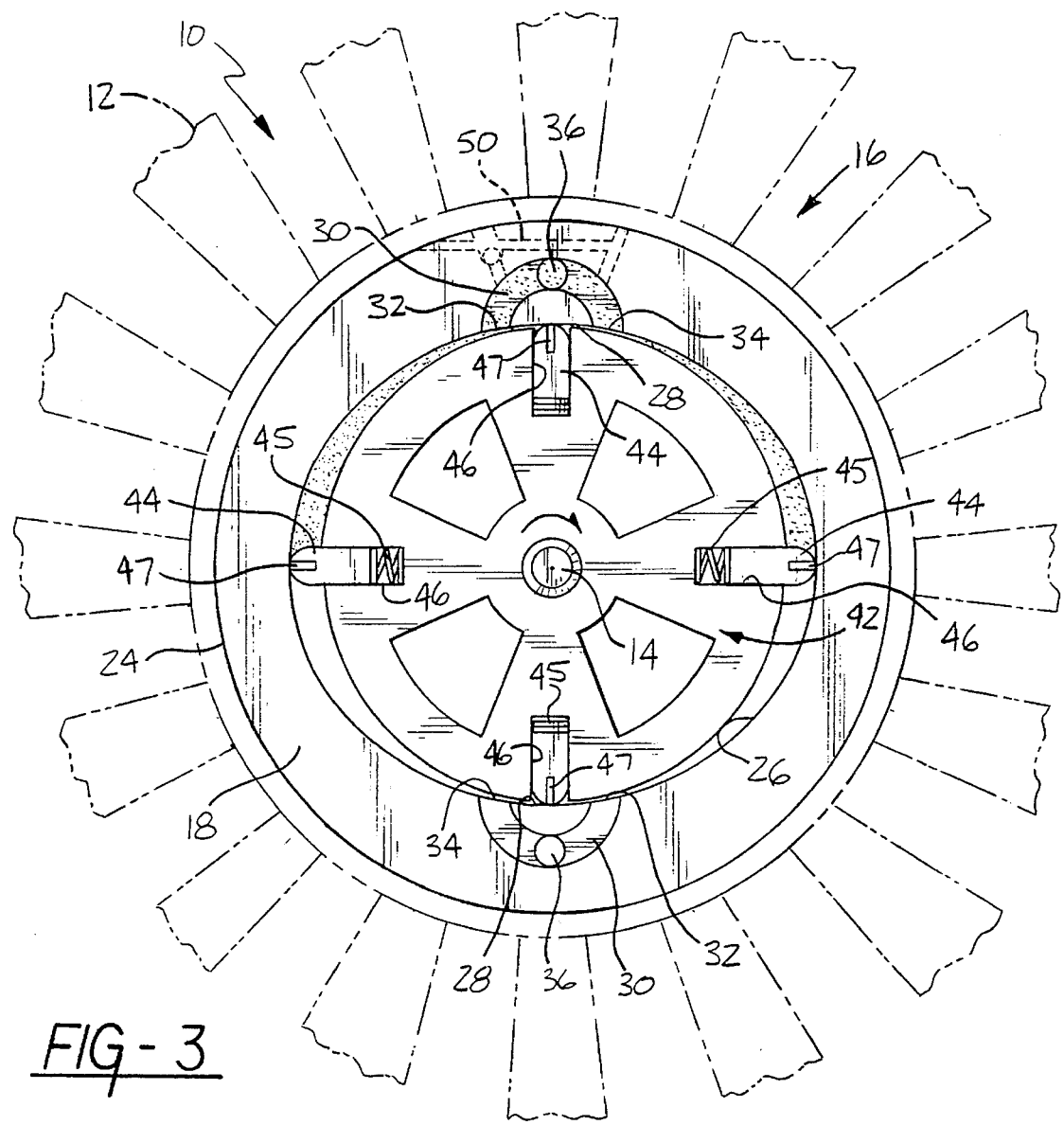
FIG. 3 is a sectional elevational view of the clutch of FIG. 1 with an engine cooling fan shown in phantom, illustrating the fluid actuated operation of the clutch.
Figure 4:
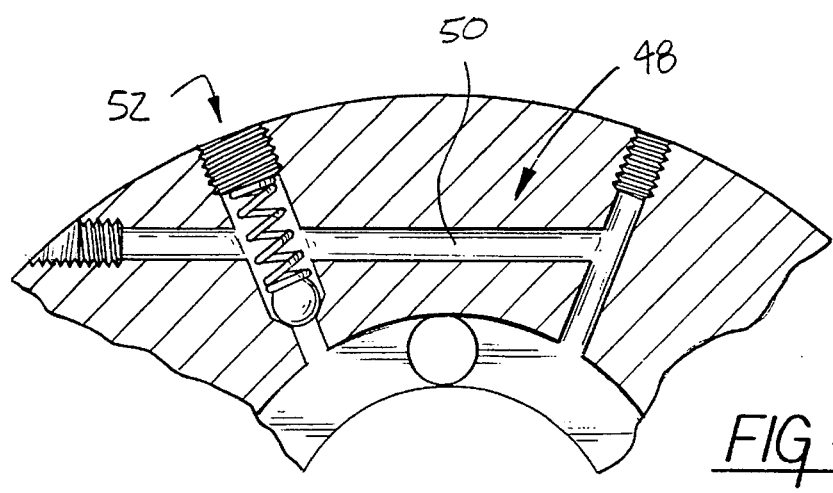
FIG. 4 is an enlarged sectional view of a bypass in the casing for limiting the torque transmission value of the clutch.

In certain applications it may be necessary or desirable to limit the amount of torque being transmitted through the clutch 10 such as when the clutch is used with an engine cooling fan rather than an air compressor or other drive. To regulate and limit the torque being transmitted through clutch 10, a bypass 48, defined by a fluid pathway 50 extending within the inner wall 26, can be provided as shown in FIG. 3 for shunting the fluid in passageway 30. As illustrated in FIG. 4, fluid pathway 50 extends from the inlet side to the outlet side of passageway 30 and includes a pressure relief valve 52 which is responsive to fluid pressure in passageway 30. When the fluid pressure in passageway 30 exceeds a predetermined limit, which corresponds to a selected torque value, relief valve 52 opens allowing fluid to flow through pathway 50 and around the inside of casing 18.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A pressure activated rotary hydraulic clutch comprising:

a sealed unit enclosing hydraulic fluid;

said unit being mounted to and rotatable about a rotatable shaft;

said shaft defining an axial direction and having a leading end disposed in said unit;

said unit including a circumferentially extending outer wall and also a circumferentially extending inner wall;

said inner wall including at least one lobe having a major dimension and a minor dimension from said shaft;

a hydraulic fluid passageway in said unit and having an inlet in said inner wall on one side of said minor dimension and an outlet in said inner wall on another side of said minor dimension;

a flow control valve disposed in said fluid passageway for controlling hydraulic fluid flow therethrough;

a flow control valve actuator in communication with said flow control valve for operating said flow control valve;

a rotor fixed to said leading end within said inner wall and rotatable with said shaft; said rotor being in proximity with said minor dimension of said lobe;

a vane on said rotor for moving said hydraulic fluid through said fluid passageway when the passageway is open and said shaft is rotated and for driving said unit through said hydraulic fluid when said passageway is restricted; and whereby said unit rotates independently of said shaft and rotor when said passageway is unrestricted and said unit rotates with said shaft and rotor when said valve is operated to restrict fluid flow through said fluid passageway.

2. The invention of claim 1 further including a bypass defined by a fluid pathway extending within said inner wall and being in communication with said fluid passageway on both the inlet and outlet sides of said valve, and said bypass including a pressure relief valve in said pathway allowing the hydraulic fluid to bypass said fluid control valve at a predetermined fluid pressure.

3. The invention of claim 1 wherein said circumferentially extending inner wall is of a multi-lobed profile having a plurality of lobes, fluid passageways therebetween and valves therein.

4. The invention of claim 3 wherein said rotor includes a like plurality of vanes corresponding to said plurality of lobes.

5. The invention of claim 1 wherein said vane is radially movable relative to said rotor and engages said inner wall through centrifugal force as said rotor is rotated.

6. The invention of claim 5 wherein said rotor includes a spring element for outwardly, radially biasing said vane.

7. The invention of claim 5 wherein said vane includes a distal end for engagement with said inner wall and wherein said vane includes a seal mounted on said distal end.

8. The invention of claim 1 wherein said actuator is a pressure sensitive actuator.

9. The invention of claim 1 wherein said actuator is a temperature sensitive actuator.

10. The invention of claim 9 wherein said actuator is an adjustably controllable actuator.

11. The invention of claim 10 further including a controller in communication with said actuator and responsive to engine operating conditions for operating said valve.

12. The invention of claim 11 wherein said controller controls said actuator for modulating operation of said valve.

13. The invention of claim 1 wherein said unit is made of plastic material.

14. The invention of claim 1 further including a fan mounted on said unit.

15. A pressure activated rotary clutch comprising:

a sealed unit enclosing hydraulic fluid;

said unit being mounted to and rotatable about a rotatable shaft;

said shaft defining an axial direction and having a leading end disposed in said unit;

said unit including a circumferentially extending outer wall and also a circumferentially extending inner wall;

said inner wall being of a generally elliptical shape and including two diametrically opposed outwardly extending lobes each having a major radius and a minor radius, and two fluid passageways interconnecting said lobes;

each said passageway having an inlet and an outlet in said inner wall on opposite sides of one of said minor radii;

a flow control valve disposed in each said fluid passageway for controlling fluid communication therethrough;

a flow control valve actuator in communication with said flow control valve for operating said flow control valve;

a rotor of a generally circular shape fixed to said leading end and rotatable with said shaft; said rotor being in proximity with said inner wall at said minor radius; and at least two diametrically opposed vanes on said rotor for moving fluid through said fluid passageways when said shaft is rotated and said passageways are open;

whereby said unit rotates independently of said shaft and rotor when said passageways are unrestricted and said unit rotates with said shaft when said valves are operated to restrict fluid flow through said fluid passageways.

* * * * *